United States Patent
Bendele et al.

(10) Patent No.: US 10,654,572 B2
(45) Date of Patent: May 19, 2020

(54) AIRCRAFT SEAT DEVICE (71) Applicant: RECARO Aircraft Seating GmbH & Co. KG, Schwaebisch Hall (DE)

(72) Inventors: Philipp Bendele, Niedernhall (DE); Adrian Philipp, Michelbach (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 376 days.

(21) Appl. No.: 14/678,117

(22) Filed: Apr. 3, 2015

(65) Prior Publication Data
US 2015/0284094 A1 Oct. 8, 2015

(30) Foreign Application Priority Data

Apr. 7, 2014 (DE) .................. 10 2014 104 928

(51) Int. Cl.
*F16B 7/04* (2006.01)
*B64D 11/06* (2006.01)

(52) U.S. Cl.
CPC .......... *B64D 11/0648* (2014.12); *B64D 11/06* (2013.01); *B64D 11/064* (2014.12); *B64D 11/0642* (2014.12); *F16B 7/042* (2013.01)

(58) Field of Classification Search
CPC ...................................................... F16B 7/042
See application file for complete search history.

(56) References Cited

U.S. PATENT DOCUMENTS

| | | | | |
|---|---|---|---|---|
| 3,887,230 A | | 6/1975 | Groning et al. | |
| 4,105,347 A | * | 8/1978 | Gossage | B66C 23/62 403/157 |
| 4,509,795 A | * | 4/1985 | Brennan | A47C 7/506 297/423.32 |
| 4,525,099 A | * | 6/1985 | Day | F16B 7/025 403/246 |
| 4,877,291 A | * | 10/1989 | Taylor | A47C 1/03255 297/300.3 |
| 4,929,113 A | * | 5/1990 | Sheu | F16C 11/045 403/157 |
| 5,338,090 A | * | 8/1994 | Simpson | B60N 2/4221 297/216.2 |
| 5,590,974 A | * | 1/1997 | Yang | A47B 47/005 403/171 |

(Continued)

FOREIGN PATENT DOCUMENTS

| | | |
|---|---|---|
| DE | 2333037 A1 | 9/1975 |
| DE | 198 53 690 A1 | 6/2000 |

(Continued)

OTHER PUBLICATIONS

Extended European Search Report and Opinion dated Aug. 12, 2015 in the corresponding EP Application No. 15162464.0 (with English translation).

(Continued)

*Primary Examiner* — Timothy J Brindley
(74) *Attorney, Agent, or Firm* — Posz Law Group, PLC (57) ABSTRACT

The invention is based on an aircraft seat device with a load-bearing frame and a plurality of structural components that are fastened at the load-bearing frame. It is proposed that at least one of the structural components is provided to be tool-lessly mounted to the load-bearing frame and/or to another structural component.

20 Claims, 10 Drawing Sheets

(56) References Cited

U.S. PATENT DOCUMENTS

| | | | | |
|---|---|---|---|---|
| 5,704,526 | A * | 1/1998 | Kuo | B62H 5/00 224/425 |
| 5,787,562 | A * | 8/1998 | Penley | A47C 5/06 29/402.08 |
| 6,227,489 | B1 * | 5/2001 | Kitamoto | B64D 11/00 244/118.5 |
| 6,675,546 | B2 * | 1/2004 | Coles | F16B 7/185 403/157 |
| 6,749,266 | B2 * | 6/2004 | Williamson | B64D 11/06 297/248 |
| 6,793,282 | B2 * | 9/2004 | Plant | B60N 2/4606 297/115 |
| 6,877,259 | B2 * | 4/2005 | Nishimura | E02F 3/3604 37/403 |
| 7,354,019 | B2 * | 4/2008 | Bauer | A47C 7/74 244/118.6 |
| 8,047,613 | B1 * | 11/2011 | Ahad | B64D 11/06 297/163 |
| 8,727,440 | B1 | 5/2014 | Giasson et al. | |
| 8,756,955 | B2 * | 6/2014 | Walchle | F16B 45/00 24/573.11 |
| 8,956,069 | B2 * | 2/2015 | Kraft | F16D 55/00 24/297 |
| 2002/0063449 | A1 * | 5/2002 | Plant | B60N 2/34 297/68 |
| 2003/0094842 | A1 | 5/2003 | Williamson | |
| 2003/0151294 | A1 * | 8/2003 | Glater | B60N 2/7005 297/440.22 |
| 2004/0066073 | A1 * | 4/2004 | Wagner | B60N 2/1615 297/337 |
| 2008/0213039 | A1 * | 9/2008 | Chen | A47D 9/00 403/325 |
| 2010/0096502 | A1 | 4/2010 | VanderWolk | |
| 2011/0148173 | A1 * | 6/2011 | Westerink | B60N 2/24 297/452.18 |
| 2011/0305502 | A1 * | 12/2011 | Lo | B62K 15/006 403/84 |
| 2012/0141195 | A1 * | 6/2012 | Lu | A47C 4/00 403/315 |
| 2012/0248842 | A1 * | 10/2012 | Brandtner | A47C 4/02 297/411.2 |
| 2013/0202345 | A1 * | 8/2013 | Long | B62D 53/068 403/109.1 |
| 2013/0207439 | A1 | 8/2013 | Rezbarik et al. | |
| 2014/0047791 | A1 * | 2/2014 | Carnes | E04C 3/04 52/653.2 |
| 2014/0265513 | A1 * | 9/2014 | Lambert | B60N 2/4879 297/440.1 |
| 2015/0078815 | A1 * | 3/2015 | Ge | B66F 13/00 403/330 |
| 2015/0299422 | A1 * | 10/2015 | El-Hibri | F16B 43/00 411/378 |
| 2017/0015423 | A1 * | 1/2017 | Udriste | B64D 11/0641 |
| 2017/0043876 | A1 * | 2/2017 | Oleson | B64D 11/064 |

FOREIGN PATENT DOCUMENTS

| | | |
|---|---|---|
| DE | 199 42 976 A1 | 3/2001 |
| DE | 102009014722 A1 | 9/2010 |
| DE | 102010032607 A1 | 2/2011 |
| DE | 102010033752 A1 | 2/2012 |
| DE | 10 2010 045 128 A1 | 3/2012 |
| DE | 10 2011 075 514 A1 | 11/2012 |
| DE | 10 2012 010 236 A1 | 11/2013 |
| DE | 102013102111 A1 | 9/2014 |
| EP | 2 463 142 A2 | 6/2012 |
| FR | 2 235 048 A1 | 1/1975 |
| WO | 2010-047900 A2 | 4/2010 |

OTHER PUBLICATIONS

Search Report dated Feb. 5, 2015 in the corresponding German patent application DE 10 2014 104 928.4 (with English translation).
Office action dated Jan. 24, 2019 issued in corresponding EP patent application No. 15 162 464.0 (and English translation thereof).

* cited by examiner

AIRCRAFT SEAT DEVICE

CROSS REFERENCE TO RELATED APPLICATION

This application is based on and incorporates herein by reference German Patent Application No. 10 2014 104 928.4 filed on Apr. 7, 2014.

STATE OF THE ART

The invention relates to an aircraft seat device according to the preamble of patent claim 1.

An aircraft seat device with a load-bearing frame and with a plurality of structural components that are fastened at the load-bearing frame has already been proposed.

The objective of the invention is in particular to provide a generic device with improved features regarding service comfort and a fast maintenance. The objective is achieved according to the invention by the features of patent claim 1, while advantageous implementations and further developments of the invention can be gathered from the subclaims.

Advantages of the Invention

The invention is based on an aircraft seat device with a load-bearing frame and with a plurality of structural components that are fastened at the load-bearing frame.

It is proposed that at least one of the structural components is provided to be tool-lessly mounted to the load-bearing frame and/or to another structural component. An "aircraft seat device" is to be understood, in particular, as a device forming at least a portion of an aircraft seat or optionally the entire aircraft seat. A "load-bearing frame" is herein to be understood, in particular, as a device having least one element and forming a basic framework for an aircraft seat, by way of which the aircraft seat is preferably mounted on a mounting plane. In this the load-bearing frame is provided to further transfer forces which are applied to the aircraft seat, e.g. by a weight force of a passenger sitting on the aircraft seat, into a cabin floor on which the aircraft seat is mounted. Herein it is conceivable that the load-bearing frame consists of a construction of different structural components, or of a single foundation plate, e.g. a plinth, on which the aircraft seat is mounted. A "structural component" is herein to be understood, in particular, as a component of the aircraft seat which is provided to absorb and transfer forces.

"Fastened at the load-bearing frame" is herein to mean, in particular, that elements, in particular the structural components, are directly or indirectly coupled with the load-bearing frame, i.e. connected to the load-bearing frame. Herein "fastened at the load-bearing frame" is also to mean that a structural component is connected to the load-bearing frame by way of one or several structural components that are arranged inbetween. By "provided" is to be understood, in particular, specifically designed and/or equipped. By an object being provided for a certain function is to be understood, in particular, that the object implements and/or carries out said certain function in at least one application state and/or operation state. By "to be tool-lessly mounted" is herein to be understood, in particular, that an element, in particular a structural component, can be mounted and demounted manually. In this, in a tool-less mounting or demounting, in particular no tool is required for fastening and/or loosening the structural component. By an implementation according to the invention one or several structural components can be mounted and/or demounted particularly easily and quickly. It can thereby be achieved that a mounting time or a demounting time of structural components can be kept advantageously short, as a result of which in particular a maintenance and repair take advantageously little time, such that running expenses, in particular as regards the service, can be saved.

Furthermore it is proposed that the aircraft seat device comprises at least one manually actuable fastening element, which is provided to mount the at least one of the structural components at the load-bearing frame and/or at another structural component. A "manually actuable fastening element" is herein to be understood, in particular, as a fastening element which can be manually actuated by a person, such that no additional tools are required for actuating the actuation element. As a result of this a structural component can be mounted to the load-bearing frame such that it is particularly easily tool-lessly mountable.

It is moreover proposed that one of the structural components is embodied as a backrest. A "backrest" is herein to be understood, in particular, as an element of the aircraft seat which extends from a seat bottom of the aircraft seat, away from the mounting plane, and is arranged at a rear end of the seat bottom, such that in the assembled state a person sitting on the aircraft seat can support himself at the backrest with his back. As a result of this the backrest can be connected to the load-bearing frame particularly advantageously and simply.

It is further proposed that one of the structural components is implemented as a seat pan. A "seat pan" is herein to be understood, in particular, as an element that is embodied as a part of a seat bottom of the aircraft seat, wherein the seat pan connects the seat bottom to the load-bearing frame of the aircraft seat device. Thus the seat pan can be connected to the load-bearing frame particularly advantageously and simply.

It is also proposed that one of the structural components is embodied as a central kinematics unit. A "central kinematics unit" is herein to be understood, in particular, as a unit consisting of a plurality of actuator units with actuators and mechanisms, which are provided for adjusting an aircraft seat and by means of which the aircraft seat can be traversed into its various positions. Thus a kinematics for adjusting the aircraft seat is easily connectable to the load-bearing frame.

Further it is proposed that one of the structural components is embodied as a headrest. A "headrest" is to be understood, in particular, as an element that is arranged at an upper end of the backrest of the aircraft seat device and is provided such that a person sitting on the aircraft seat can support his head thereon. The headrest can thus be connected to the load-bearing frame in a particularly advantageous and simple manner.

It is also proposed that one of the structural components is embodied as an actuator unit with an actuator. An "actuator unit" is herein to be understood, in particular, as an assembly unit consisting of at least one actuator and a device, in particular a frame, which the actuator is fastened at, the entire actuator unit being functional if it is correctly connected, e.g. to a power supply. As a result of this an actuator for controlling the aircraft seat can be integrated into the load-bearing frame of the aircraft seat device in a particularly simple and advantageous manner.

Moreover it is proposed that the at least one actuable fastening element is provided to be actuated from above. Herein, by the "fastening element being provided to be actuated from above" is to be understood, in particular, that the fastening element can be actuated by a person from above, namely from a side that faces away from the mounting plane. As a result of this, the fastening element is particularly advantageously actuable and a mounting and/or demounting of the corresponding structural component can be effected particularly advantageously, quickly and in an ergonomic poise.

Furthermore it is proposed that the fastening element is embodied as a spring pin. Thereby the fastening element can particularly advantageously and easily be implemented such that it is actuable by a person.

Moreover it is proposed that the aircraft seat device comprises at least one safety spring, which secures the fastening element for the connection in an assembled state. As a result of this a connection by means of the fastening element can be implemented especially advantageously and securely.

It is further proposed that the structural component embodied as an actuator unit is provided to be completely pre-assembled with the actuator and to be built into the load-bearing frame and/or another structural component. Herein "completely pre-assembled" is to mean, in particular, that the actuator unit can be built into the aircraft seat device as a completely pre-assembled module, and then merely must be fastened therein and connected by different connectors to corresponding connectors of the aircraft seat device. An actuator is thus particularly easily and quickly mountable and demountable, as a result of which a replacing of an actuator in an aircraft seat can be carried out advantageously quickly.

It is also proposed that at least four structural components are tool-lessly mountable at the load-bearing frame. By "at least four structural components" is herein to be understood, in particular, that at least four structural components of the aircraft seat device, in a special embodiment at least six structural components and in a particularly advantageous embodiment a plurality of or all structural components are tool-lessly mountable at the load-bearing frame. As a result of this, the aircraft seat device and hence the aircraft seat can be particularly advantageously be implemented for a quick mounting and demounting of structural components, as a result of which a service time for a repair of the aircraft seat can be implemented to be especially advantageously short.

Herein the aircraft seat device according to the invention is not to be restricted to the application and embodiment described above. In particular the aircraft seat device according to the invention can, for implementing a functionality herein described, comprise a number of individual elements, components and units that differs from a number mentioned herein.

DRAWINGS

Further advantages may be taken from the following description of the drawing. In the drawing an exemplary embodiment of the invention is shown. The drawing, the description and the claims contain a plurality of features in combination. The person skilled in the art will purposefully also consider the features separately and will further combine them expediently.

It is shown in:

FIG. 1 A schematic presentation of an aircraft seat with an aircraft seat device according to the invention, FIG. 2 a schematic view of the aircraft seat device, depicted without demounted structural component embodied as a seat pan, FIG. 3 a detail view of a structural component embodied as a central kinematics unit, with two structural components embodied as actuator units, in the aircraft seat device, FIG. 4 a detail view of a connection of a structural component embodied as an actuator unit, FIG. 5 a sectional view, wherein the connection of a structural component embodied as an actuator unit is shown in detail, FIG. 6 a detail view of a connection of a structural component embodied as an actuator unit, in a sectional view, FIG. 7 a sectional view of the structural component embodied as a central kinematics unit, with two structural components embodied as actuator units, in the aircraft seat device, FIG. 8 a detail view of a connection of a structural component embodied as an actuator unit, in a sectional view, FIG. 9 a detail view of the connection of a structural component embodied as a headrest to a structural component embodied as a backrest, and FIG. 10 a sectional view through a connection of a structural component embodied as a backrest to the structural component that is embodied as a central kinematics unit.

DESCRIPTION OF THE EXEMPLARY EMBODIMENT

In FIGS. 1 to 9 an exemplary embodiment of an aircraft seat device is presented. The aircraft seat device is part of a partially shown aircraft seat 26. Herein the aircraft seat device embodies a great portion of the aircraft seat 26. The aircraft seat 26 is embodied as a part of an aircraft (not shown in detail). Herein a plurality of aircraft seats 26 is arranged in the aircraft. The aircraft seat 26 is mounted on a cabin floor of the aircraft. The cabin floor herein forms a mounting plane on which the aircraft seat 26, which comprises the aircraft seat device, is mounted. To the purpose of mounting the aircraft seat device, the aircraft seat device comprises a mounting unit 28. The mounting unit 28 comprises connection elements (not shown in detail), which are provided to fasten the aircraft seat device on the mounting plane. Herein the cabin floor preferably comprises fastening rails, by which the connection elements of the mounting unit 28 firmly couple the aircraft seat 26 with the cabin floor and hence with the aircraft.

The aircraft seat device comprises a load-bearing frame 10. The load-bearing frame 10 is connected to the mounting unit 28. The load-bearing frame 10 forms a substructure for the aircraft seat 26 which comprises the aircraft seat device. Herein the load-bearing frame 10 is provided for the connection of two aircraft seats 26. It is principally also conceivable that the load-bearing frame 10 is merely provided for the connection of the one aircraft seat 26 or for the connection of more than two aircraft seats 26. The load-bearing frame 10 comprises a plurality of connection elements, by which further components of the aircraft seat 26 can be connected to the load-bearing frame 10.

The aircraft seat device comprises a plurality of structural components 12, 14, 16, 18, 20, 22, 24, 138. The structural components 12, 14, 16, 18, 20, 22, 24, 138 of the aircraft seat device are implemented as elements building the aircraft seat 26, a part of which is the aircraft seat device. Herein the structural components 12, 14, 16, 18, 20, 22, 24, 138 are embodied in such a way that they can take up loads and transfer them into the load-bearing frame. The first structural component 12 is embodied as a central kinematics unit. The first structural component 12 that is embodied as a central kinematics unit forms an assembly module which is connected to the load-bearing frame 10 of the aircraft seat device in a completely pre-assembled state. To this purpose the load-bearing frame 10 comprises two form-lock elements which are embodied as rails and are oriented in a seat direction parallel to each other, via which form-lock elements the first structural component 12 that is embodied as a central kinematics unit can be coupled with the load-bearing frame 10. The first structural component 12 that is embodied as a central kinematics unit comprises a frame 30, which forms a basic framework of the first structural component 12 that is embodied as a central kinematics unit. The frame 30 is herein formed from a plurality of profile elements 32, 34, 36, 38, 40, 42, 44, 46, 48 which are firmly connected to each other. The profile elements 32, 34, 36, 38, 40, 42, 44, 46, 48 of the frame 30 are herein connected by means of screw connections. Of course it is principally also conceivable that the profile elements 32, 34, 36, 38, 40, 42, 44, 46, 48 which form the frame 30 are connected to each other by means of other connection methods deemed expedient by the person skilled in the art, e.g. by a welding connection, a rivet connection, or a further form-lock connection. Herein it is principally also conceivable that the profile elements 32, 34, 36, 38, 40, 42, 44, 46, 48 are tool-lessly connectable to each other. The profile elements 32, 34 herein form an exterior frame. Herein the two profile elements 32, 34 are laterally arranged in an upper region of the first structural component 12 that is embodied as a central kinematics unit, and are connected to each other via the profile element 36 at their respective front ends. At a rear end the two profile elements 32, 34 are connected to each other via the profile element 38. Herein one respective articulate connection flange 50, 52, via which further structural components 14 can be connected to the structural component 12 that is embodied as a central kinematics unit and thus to the load-bearing frame 10, is arranged at the respective rear ends of the laterally arranged profile elements 32, 34. The profile elements 40, 42 of the frame 30 are respectively articulately connected to one of the laterally arranged profile elements 32, 34 and extend in a direction of the mounting plane, i.e. toward the load-bearing frame 10 of the aircraft seat device. As a result of this, the frame 30 of the first structural component 12 that is embodied as a central kinematics unit is pivotable and can thus implement various sitting and/or recumbent positions of the aircraft seat 26, a part of which is the aircraft seat device. The profile elements 44, 46, 48 form an interior frame of the central kinematics unit. The profile elements 44, 46, 48 are arranged spaced apart to each other and connect the profile element 36, which connects the two profile elements 32, 34 to each other at a front end, and the profile element 38, which connects the two profile elements 32, 34 to each other at a rear end. The profile elements 44, 46, 48 form a connection structure for further structural components of the aircraft seat device and for further elements of the first structural component 12 that is embodied as a central kinematics unit.

The structural component 12 that is embodied as a central kinematics unit is tool-lessly connectable to the load-bearing frame 10. To this purpose the aircraft seat device comprises a manually fastenable fastening element 134, which is manually actuable. The manually actuable fastening element 134 connects the structural component 12 that is embodied as a central kinematics unit to the load-bearing frame 10. Herein the structural component 12 that is embodied as a central kinematics unit is directly connected to the load-bearing frame 10. Herein the structural component 12 that is embodied as a central kinematics unit is coupled to the load-bearing frame 10 merely by the form-lock elements of the load-bearing frame 10 that are embodied as rails and by the fastening element 134.

Figure 1:
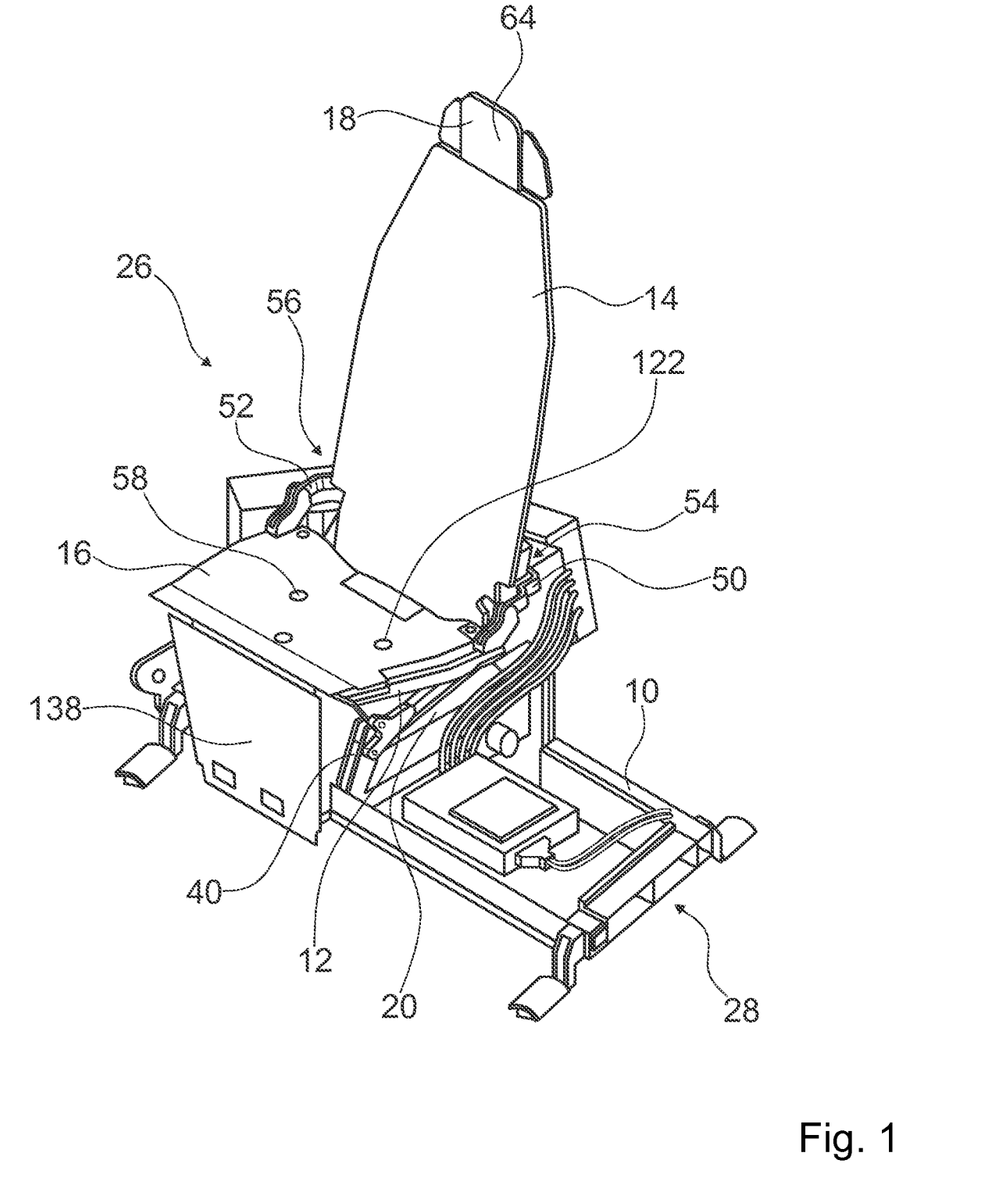
Figure 2:
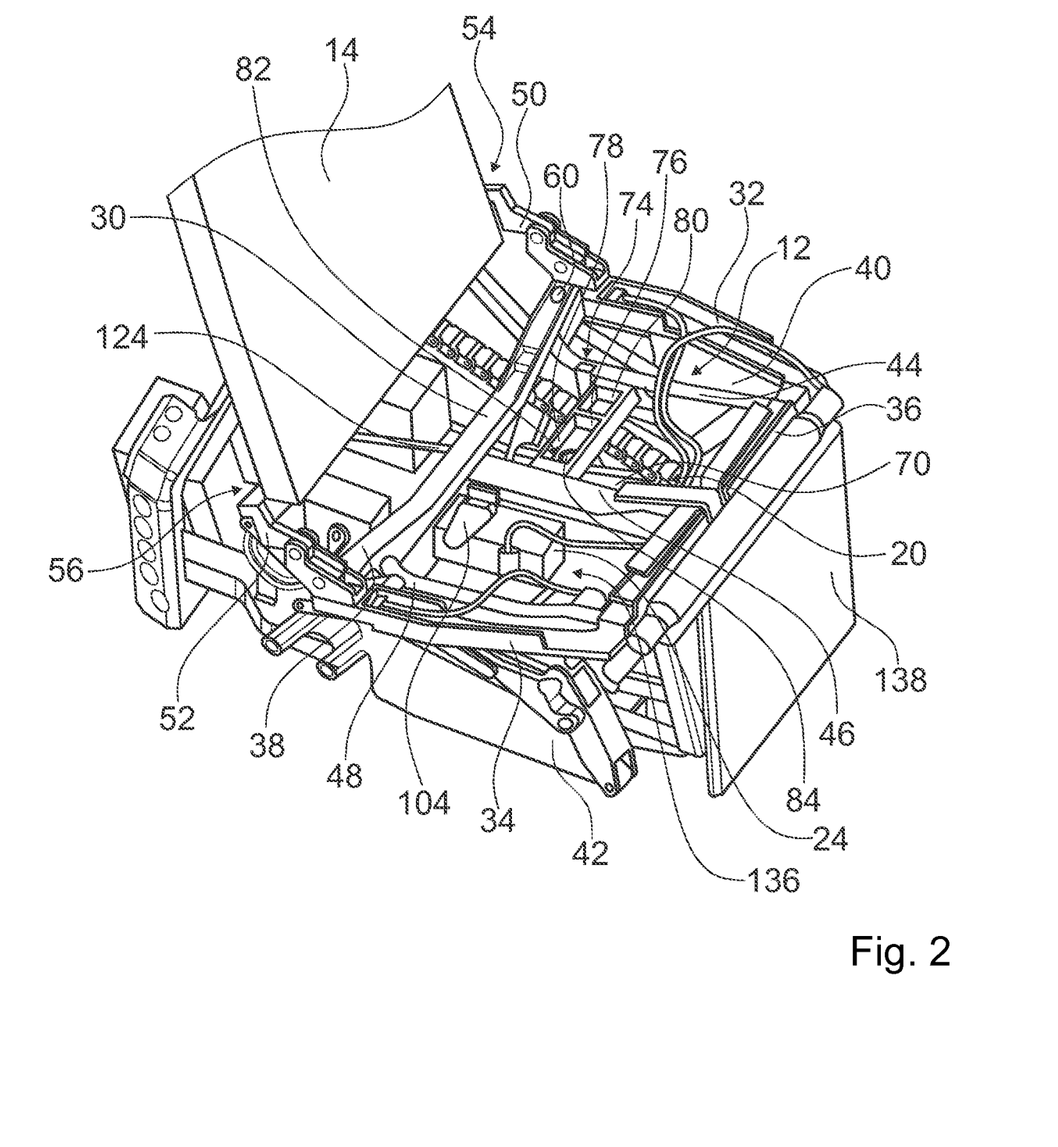
Figure 3:
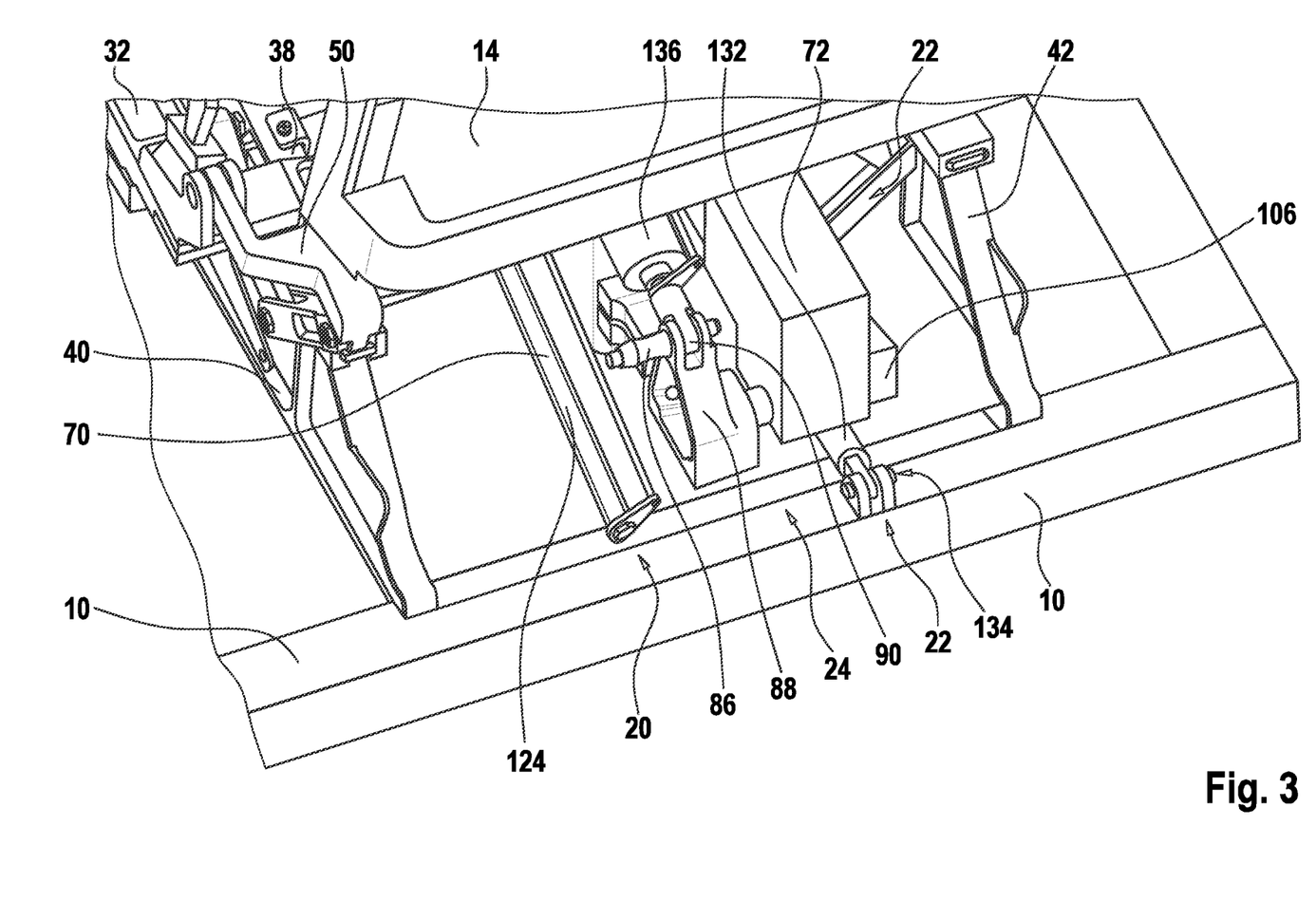
Figure 4:
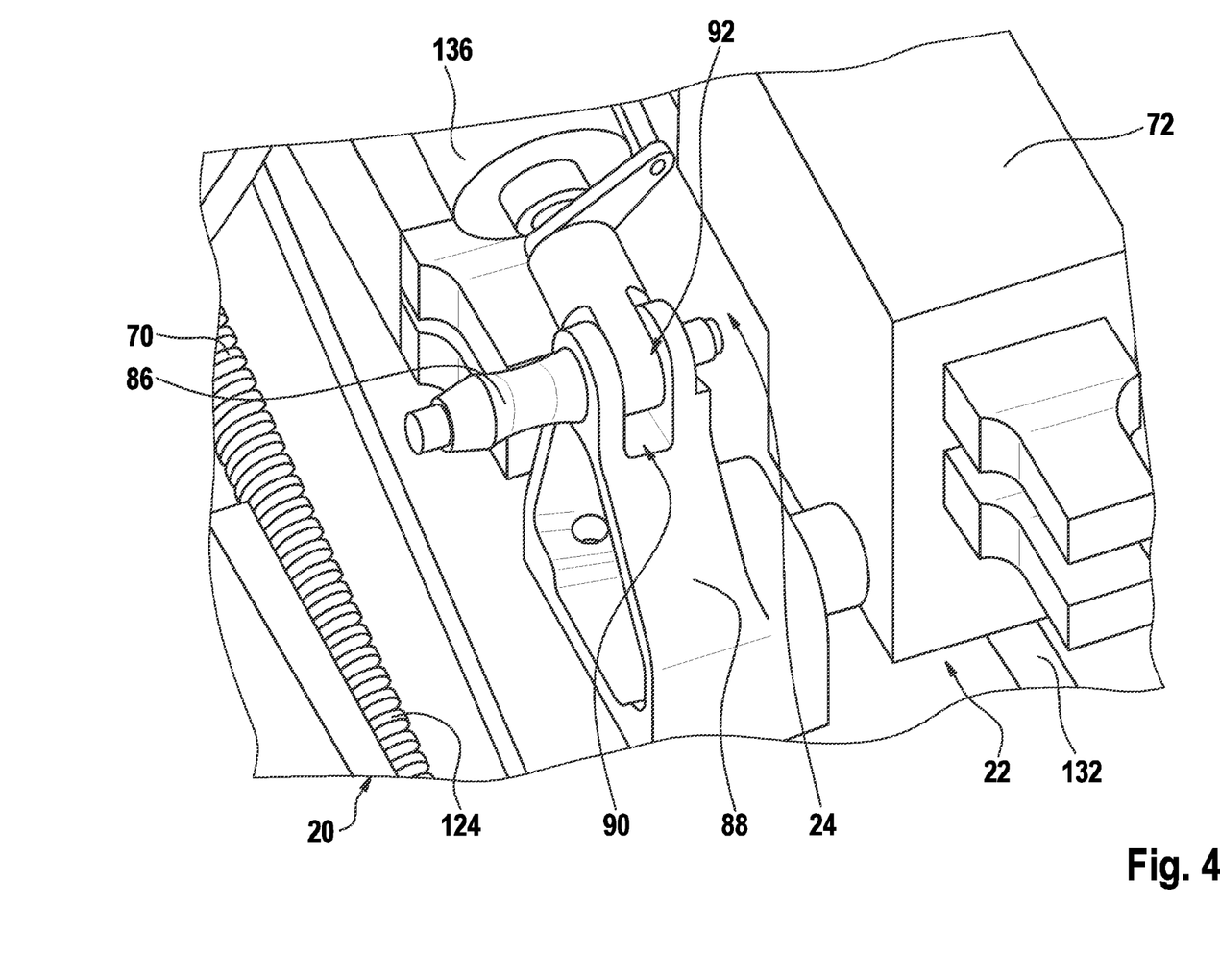
Figure 5:
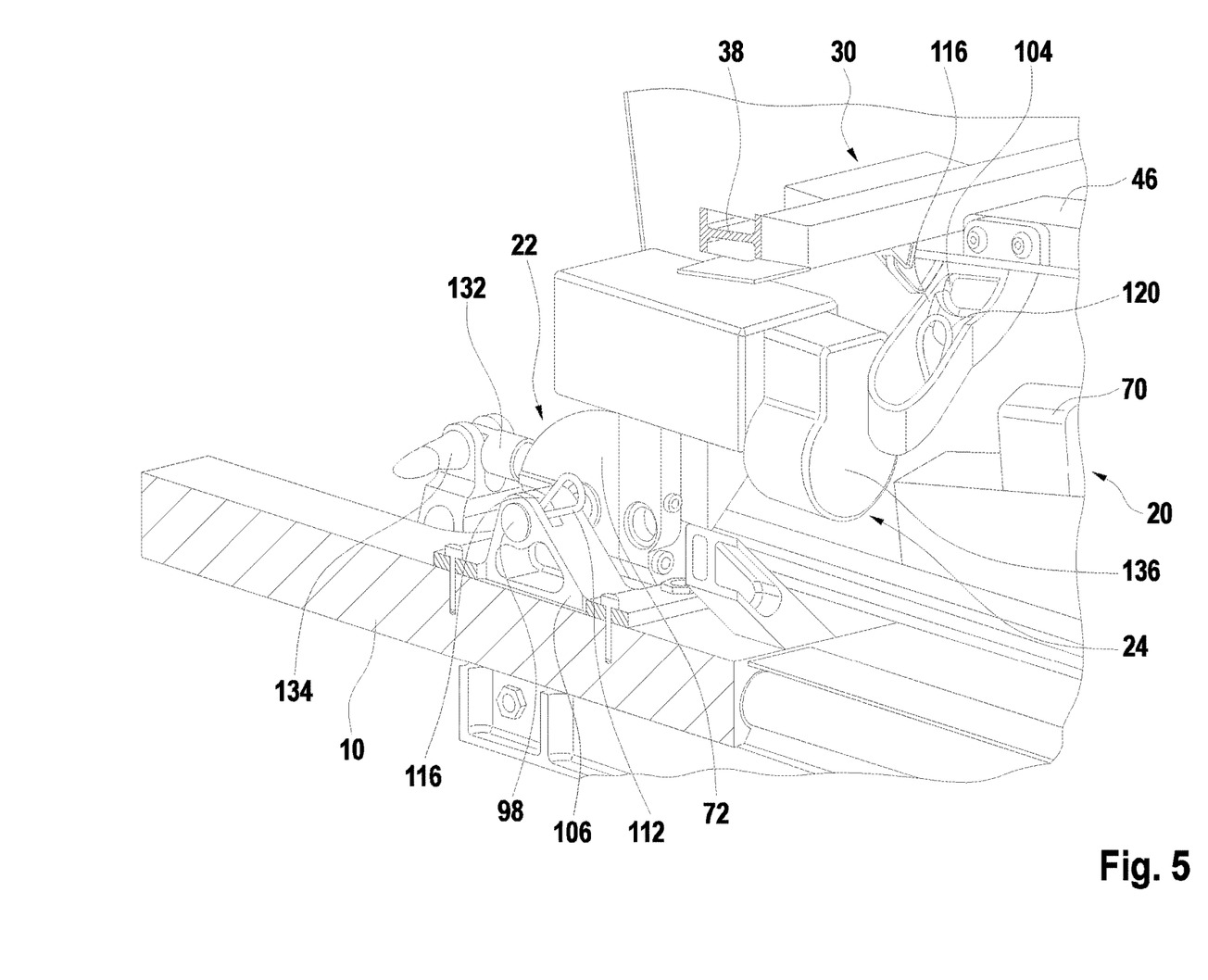
Figure 6:
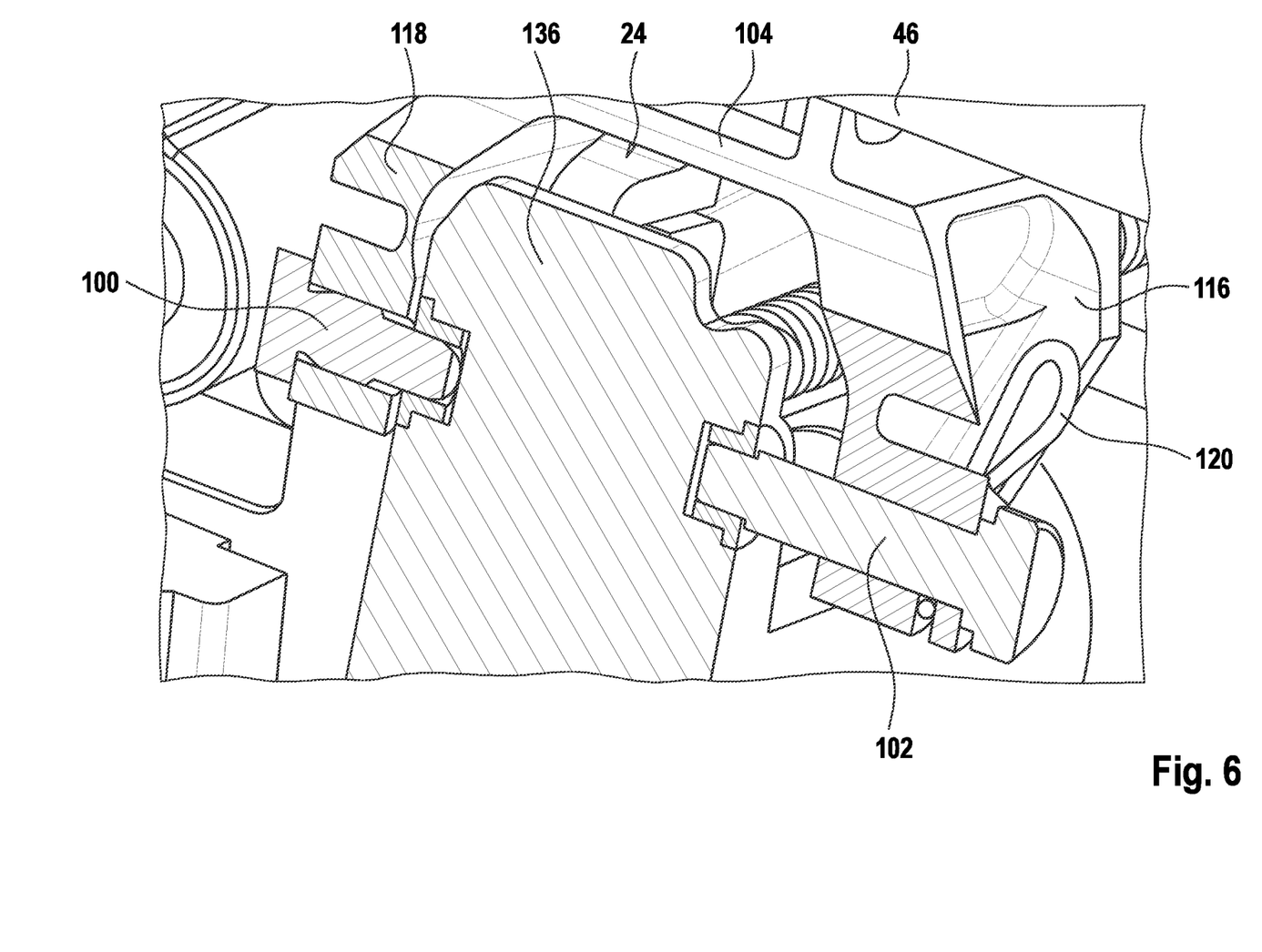
Figure 7:
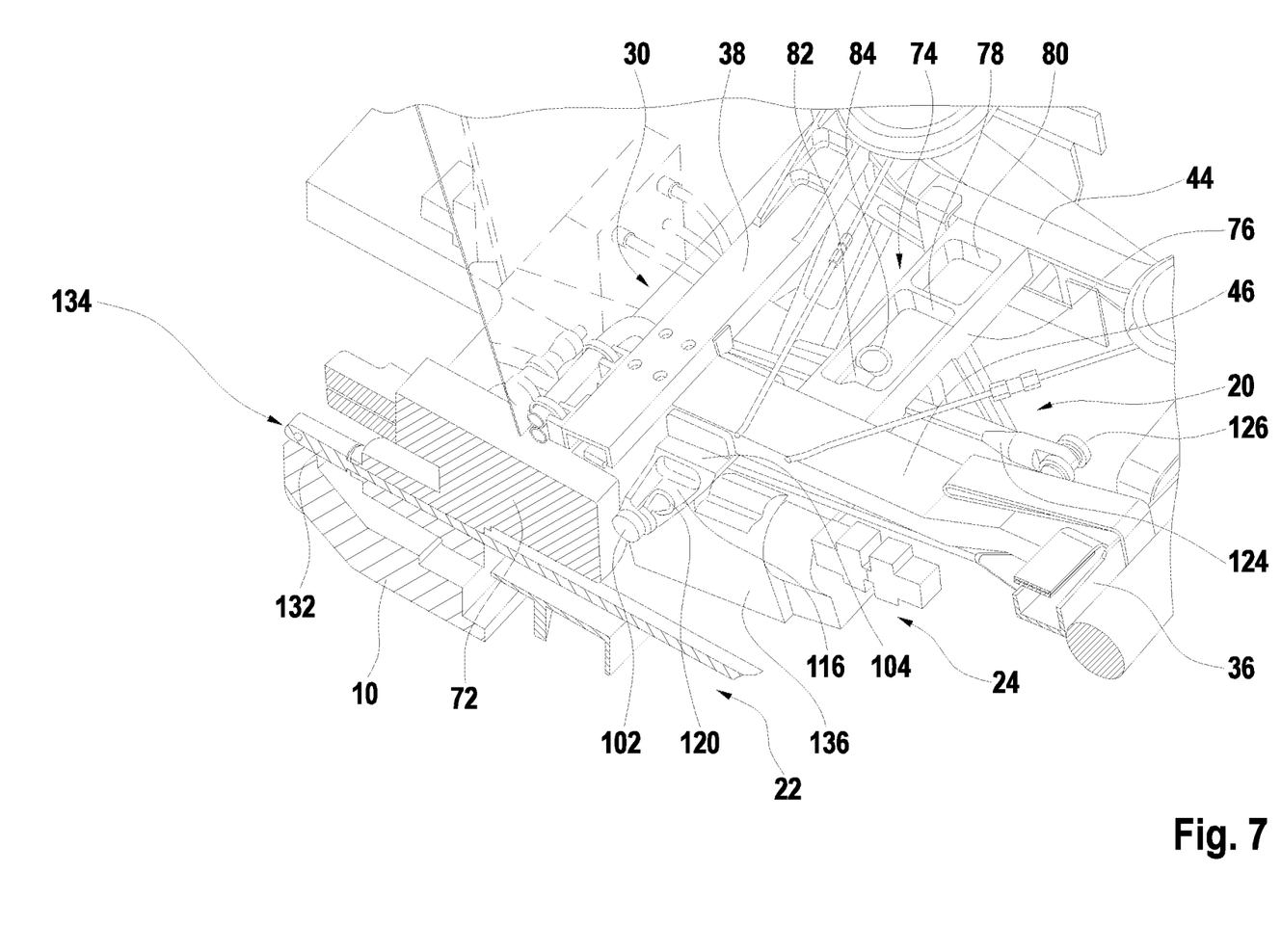
Figure 8:
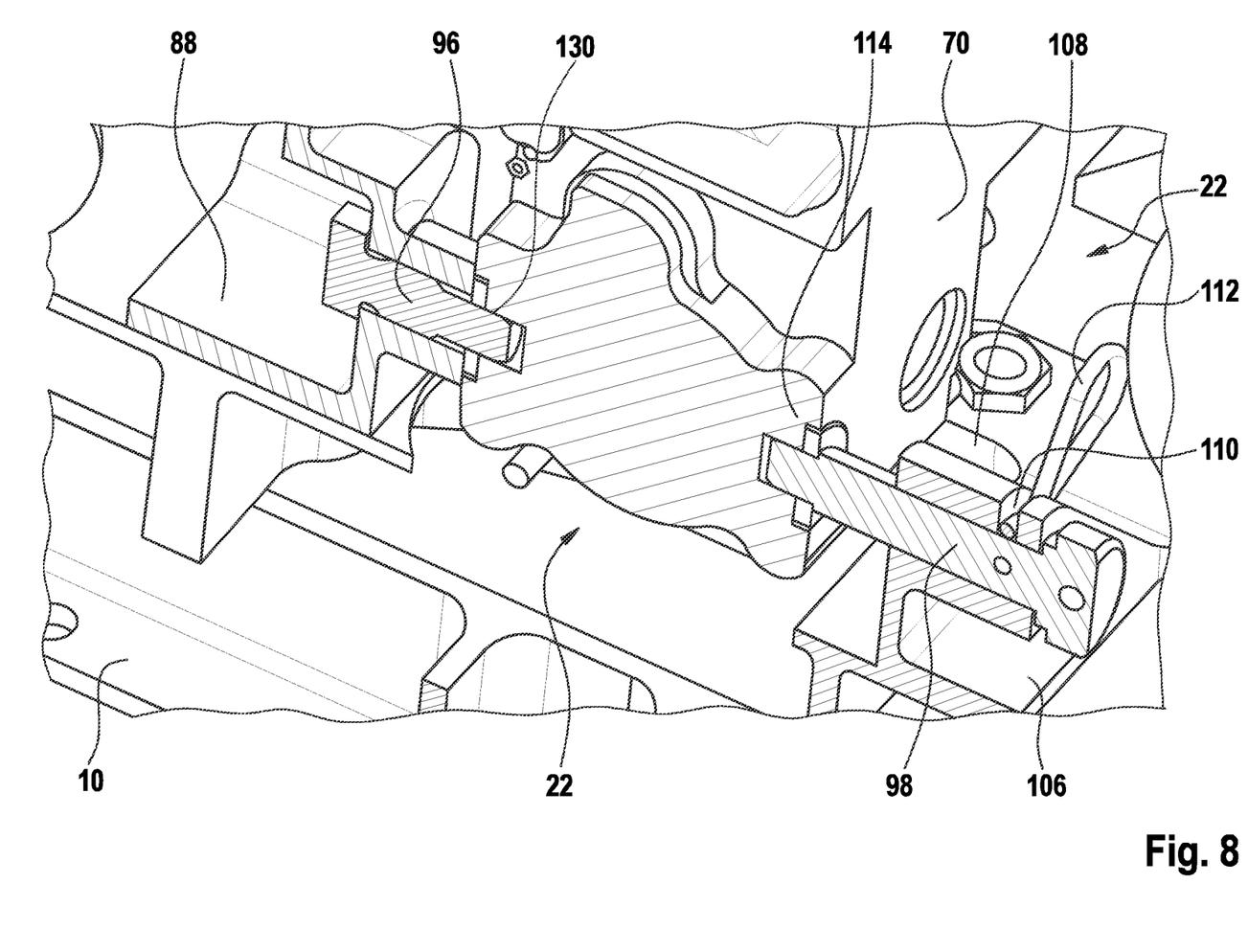
Figure 9:
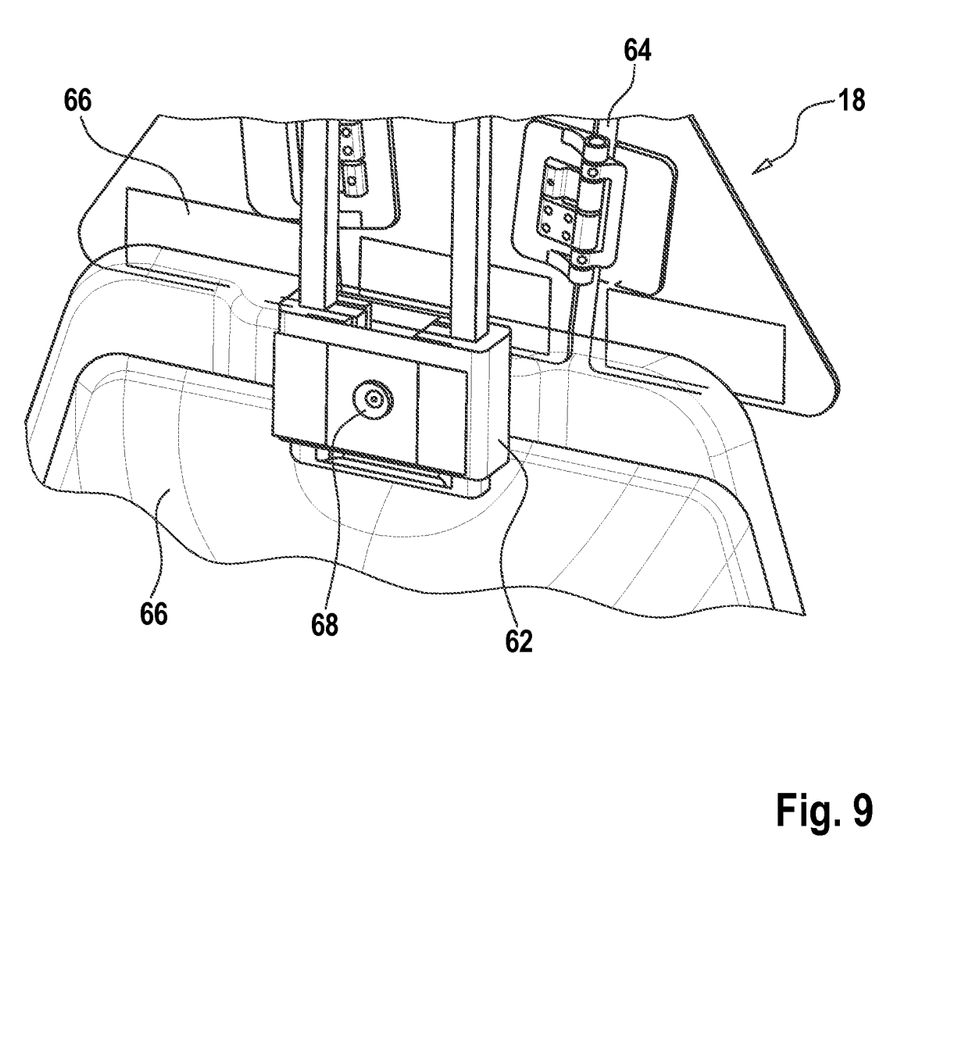
Figure 10:
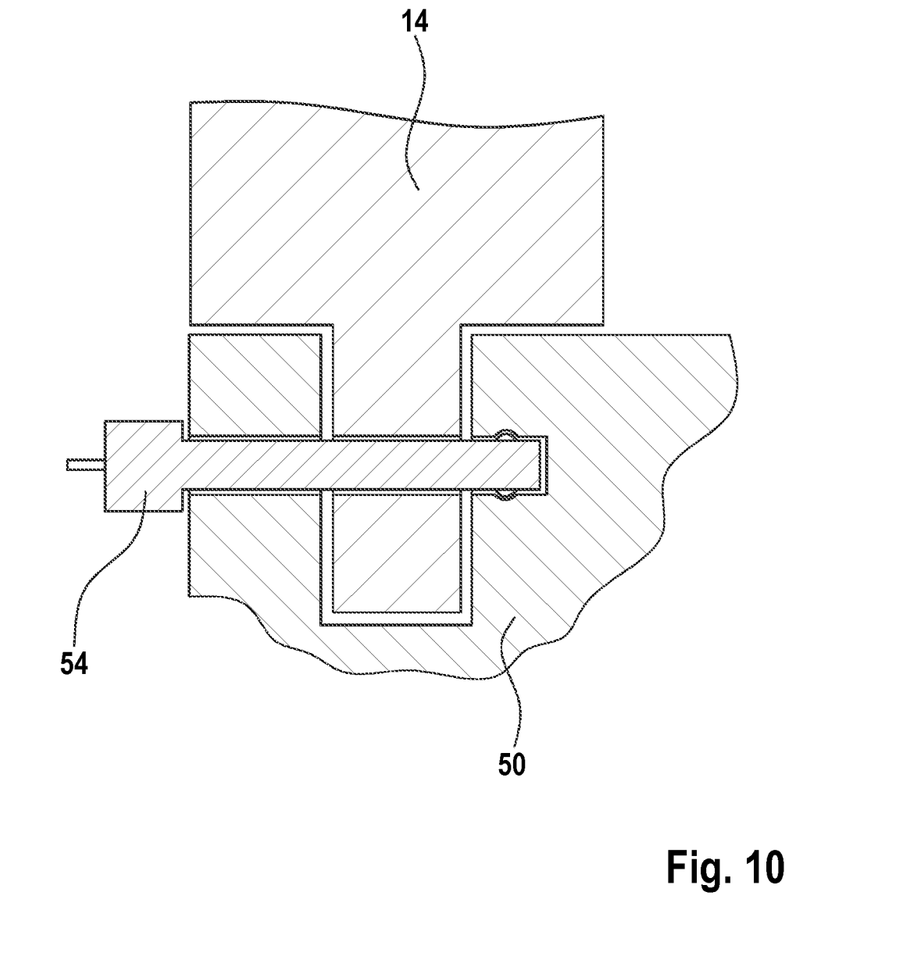

The second structural component 14 is embodied as a backrest. The second structural component 14 that is embodied as a backrest is provided to be tool-lessly connected to the load-bearing frame 10. The second structural component 14 that is embodied as a backrest is in an assembled state connected to the structural component 12 that is embodied as a central kinematics unit. The second structural component 14 that is embodied as a backrest is herein laterally connected to the articulate connection flanges 50, 52 respectively, which are connected to the frame 30 of the first structural component 12. The aircraft seat device comprises two manually actuable fastening elements 54, 56, which connect the structural component 14 that is embodied as a backrest to the load-bearing frame 10. The two manually actuable fastening elements 54, 56 are implemented as spring pins. The fastening elements 54, 56 that are implemented as spring pins are herein respectively arranged firmly in a through-hole in the respective connection flange 50, 52 and comprise an axially movable partial region. The axially movable partial region of the fastening element 54, 56 is herein manually brought into an inserted position during assembly, such that the structural component 14 that is embodied as a backrest is correctly orientated with respect to the connection flanges 50, 52 and thus to the fastening elements 54, 56. The structural component 14 that is embodied as a backrest comprises for each fastening element 54, 56 one respective form-lock element implemented as a through-hole. To the purpose of connecting the structural component 14 that is embodied as a backrest to the structural component 12 that is embodied as a central kinematics unit, the axially movable partial regions are guided through the form-lock elements implemented as through-holes and are latched into form-lock elements implemented as recesses in the connection flanges 50, 52. As a result of this the structural component 14 embodied as a backrest is connected to the structural component 12 embodied as a central kinematics unit. FIG. 10 schematically shows a sectional view through a connection point, in which the structural component 14 embodied as a backrest is connected to the connection flange 50 via a fastening element 54.

The third structural component 16 is embodied as a seat pan. The structural component 16 embodied as a seat pan is provided to be tool-lessly mounted to the frame 30 of the first structural component 12 that is embodied as a central kinematics unit. The third structural component 16 embodied as a seat pan is provided to be tool-lessly mounted to the load-bearing frame 10. The structural component 16 that is embodied as a seat pan is in a mounted state connected to the profile elements 32, 34 of the frame 30 of the structural component 12 that is embodied as a central kinematics unit. The structural component 16 that is embodied as a seat pan is tool-lessly operable with the structural component 12 that is embodied as a central kinematics unit. For the tool-less connection of the structural component 16 that is embodied as a seat pan, the aircraft seat device comprises five manually actuable fastening elements 58. The fastening elements 58 are implemented as fulcrum pins. The further fastening elements 58 that are implemented as fulcrum pins comprise at an underside a form-lock element that is provided to be brought into a form-lock with a correspondingly embodied form-lock element by rotating the fastening element 58. For the connection of the structural component 16 that is embodied as a seat pan, the frame 30 of the structural component 12 that is embodied as a central kinematics unit comprises for each fastening element 58 one receptacle 60. The receptacles 60 herein each have an undercut, in which the fastening elements 58, which are implemented as fulcrum pins, engage in an assembled state. To this purpose the fastening elements 58, which are implemented as fulcrum pins, are in an assembly introduced into the receptacles 60 with their undersides and then are there rotated by a defined angle, e.g. 180°, such that the form-lock element of the fastening element 58 is brought into a form-lock with the undercut of the receptacle 60. As a result of this, the fastening elements 58 are firmly connected with the frame 30 of the structural component 12 that is embodied as a central kinematics unit. For fastening the structural component 16 that is embodied as a seat pan, the structural component 16 that is embodied as a seat pan comprises for each fastening element 58 one respective through-hole 122. In an assembled state the fastening elements 58 are guided through the through-holes 122 of the structural component 16 that is embodied as a seat pan and are fastened in a form-lock in the receptacles 60 of the frame 30, as a result of which the structural component 16 that is embodied as a seat pan is firmly coupled with the frame 30. By simply rotating the fastening elements 58 with one hand, the structural component 16 that is embodied as a seat pan can be firmly connected to the frame 30 or can be detached from the frame 30. Principally it is of course also conceivable that the structural component 16 that is embodied as a seat pan is firmly connected with the frame 30 by means of other fastening elements, e.g. spring pins, plastic clips, latch elements, manual screw locks or other manually actuable fastening elements that are deemed expedient by the person skilled in the art.

The fourth structural component 18 is embodied as a headrest. The fourth structural component 18 that is embodied as a headrest is provided to be tool-lessly mounted to the structural component 14 and thus to the load-bearing frame 10. The structural component 18 that is embodied as a headrest is in an assembled state mounted to the structural component 14 that is embodied as a backrest. The structural component 18 that is embodied as a headrest comprises a base body 62, via which the structural component 18 that is embodied as a headrest is connected to the structural component 14 that is embodied as a backrest. The base body 62 forms a bearing by which a head rest element 64 of the structural component 18 that is embodied as a headrest is slidable in height via a rail element 66. For the connection of the fourth structural component 18 that is embodied as a headrest, the aircraft seat device comprises a manually actuable fastening element 68. The manually actuable fastening element 68 is implemented as a spring pin. For the connection of the two structural components 14, 18 the structural component 14 embodied as a backrest comprises at its rear side and the structural component 18 embodied as a headrest comprises in its base body 62 respectively one receptacle (not shown in detail). By way of the receptacles the two structural components 14, 18 are connectable to each other by means of the fastening element 68 that is implemented as a spring pin. For the connection of the two structural components 14, 18 their receptacles are orientated in an alignment and the fastening element 68 that is implemented as a spring pin is manually inserted into the receptacles to firmly connect the two structural components 14, 18 to each other. For releasing the connection of the structural component 14 embodied as a backrest and the structural component 18 embodied as a headrest, the fastening element 68 that is implemented as a spring pin is manually actuated, for example by pushing, to release the form-lock connection between the two structural components 14, 18. For anti-twist protection of the base body 62 with respect to the structural component 14 that is embodied as a backrest, the base body 62 and the structural component 14 that is embodied as a backrest comprise a plurality of form-lock elements (not shown in detail). The form-lock elements of the base body 62 are embodied as bumps which, to the purpose of anti-twist protection, engage into the form-lock elements which are implemented as recesses and are formed equivalent to the form-lock elements of the base body 62.

The fifth structural component 20 is embodied as an actuator unit. The structural component 20 embodied as an actuator unit comprises an actuator 70. For holding the actuator 70, the structural component 20 embodied as an actuator unit comprises a rack device 74. The rack device 74 is provided to fix the actuator 70 in an assembled state, thus holding it in a position in which it is provided for operation in the aircraft seat device. By way of the rack device 74, the actuator 70 is positioned in the aircraft seat device and hence in the aircraft seat 26 and can thus exert a force on respective elements of the aircraft seat 26 to adjust them. The actuator 70 is implemented for an adjustment of a structural component 24 that is embodied as a footrest. The structural component 20 embodied as an actuator unit is herein implemented as a pre-assemblable assembly group. The structural component 20 embodied as an actuator unit is in an assembly completely pre-assembled with the actuator 70 and then mounted to the frame 30 of the structural component 12. The rack device 74 hereto comprises an upper profile element 76. The upper profile element 76 is fastened at an upper side of the actuator 70. Herein the profile element 76 is firmly connected with the actuator 70 via two manually actuable fastening elements (not shown in detail). The fastening elements (not shown in detail) for connecting the actuator 70 to the profile element 76 are herein implemented as spring pins. Thereby the profile element 76 is advantageously simply and manually detachable from the actuator 70. The profile element 76 has a rectangular basis shape, in which two recesses 78, 80 have been introduced. The recesses 78, 80 are herein arranged on a side that faces away from the actuator 70 in the assembled state. For the connection of the structural component 20 that is embodied as an actuator unit to the load-bearing frame 10, the profile element 76 of the rack device 74 is in an assembled state connected with the profile elements 44, 46 of the frame 30 of the structural component 12 that is implemented as a central actuator unit. Herein the profile element 76 connects the two profile elements 44, 46 of the frame 30. For the connection of the profile element 76 to the frame 30 of the structural component 12, the aircraft seat device comprises a manually actuable fastening element 82. The manually actuable fastening element 82 is herein provided to be actuated from above. Herein the manually actuable fastening element 82 is implemented as a spring pin. The fastening element 82 implemented as a spring pin is herein arranged in a receptacle (not shown in detail) in the profile element 76, which is implemented as a through-hole. Herein the fastening element 82 is arranged on a side of the profile element 76 which faces towards the profile element 76. Herein the fastening element 82 comprises at a front end an axially movable partial region which is provided for a form-lock. For receiving the axially movable partial region the profile element 46 comprises laterally a receptacle, into which the axially movable partial region of the fastening element 82 engages for a form-lock connection. A rear end of the fastening element 82 herein protrudes into the recess 78 of the profile element 76. Herein an actuation ring 84 is mounted to the rear end of the fastening element 82, which is coupled with the axially movable partial region and via which the axially movable partial region of the fastening element 82 can be manually moved by a person. On a side that faces towards the profile element 44, the profile element 76 comprises a rigid pin, which extends from the profile element 76 in a direction of the profile element 76. The pin is herein not shown in detail, and it is also conceivable that the profile element 76 comprises on the side that faces towards the profile element 44 two or more pins. The profile element 76 comprises on a side that is oriented inwards in a direction of the profile element 76 a receptacle that is embodied correspondingly to the pin of the profile element 76, in which the pin is in an assembled state arranged in a form-lock manner, for connecting the structural component 20 that is embodied as an actuator unit. The actuator 70 comprises an actuation rod 124. For the adjustment of the structural component 24 that is embodied as a footrest, the actuation rod 124 of the actuator 70 is axially slidable in a main extension direction of the actuation rod 124. For the adjustment of the structural component 24 that is embodied as a footrest, a front end of the actuation rod 124 is firmly coupled with the structural component that is embodied as a footrest. To this purpose the actuation rod 124 forms a receptacle at the front end. The structural component 24 that is embodied as a footrest also forms a receptacle. For the connection of the actuation rod 124 to the structural component 24 that is embodied as a footrest, the aircraft seat device comprises a manually actuable fastening element 126. The manually actuable fastening element 126 is implemented as a bolt. The fastening element 126 that is implemented as a bolt is, for connecting the actuation rod 124 and the structural component 24 that is embodied as a footrest, guided through the receptacles of the actuation rod 124 and of the structural component 24 embodied as a footrest, and is secured by a safety spring at an end situated opposite a front end of the fastening element 126 that is implemented as a bolt. For the assembly, the fastening element 126 that is implemented as a bolt can be just guided along into the receptacles of the actuation rod 124 and of the structural component 24 that is embodied as a footrest, and can be secured manually by means of the safety spring. A disassembly is effected accordingly, by manually removing the safety spring and by detaching the fastening element 126 that is implemented as a bolt from the receptacles of the actuation rod 124 and of the structural component 24 that is embodied as a footrest.

The sixth structural component 22 is also embodied as an actuator unit. The structural component 22 embodied as an actuator unit comprises an actuator 72. The actuator 72 is provided for the adjustment of the structural component 12 that is embodied as a central kinematics unit with respect to the load-bearing frame 10. For the connection of the structural component 22 that is embodied as an actuator unit, the aircraft seat device comprises a plurality of manually actuable fastening elements 96, 98, 134. The fastening elements 96, 98 are provided to connect a bottom end of the structural component 22 with the structural component 12 that is embodied as a central kinematics unit. To this purpose the frame 30 of the structural component 12 embodied as a central kinematics unit comprises a receiving element 88 and a further receiving element 106, which are firmly connected with the frame 30 of the structural component 12 that is embodied as a central kinematics unit. The receiving elements 88, 106 are arranged spaced apart from each other and the structural component 22 that is embodied as an actuator unit is in an assembled state arranged between the two receiving elements 88, 106. The fastening element 96 is implemented as a thread pin, which is firmly screwed in the receiving element 88. The fastening element 96 comprises at a front end a bolt-shaped partial region, which is provided to latch into a receptacle in the structural component 22 in an assembled state of the structural component 22. The fastening element 96 is screwed into a receptacle of the receiving element 88 and protrudes with its front end over the receiving element 88 in a direction of the receiving element 106. The fastening element 98 is implemented as a bolt having a head. The receiving element 106 comprises a through-hole 108, through which the fastening element 98 is guided in the assembled state. Herein the through-hole 108 has a puncture 110. The aircraft seat device comprises a safety spring 112, which secures the fastening element 98 in an assembled state. The safety spring is implemented as a cotter pin. For coupling with the fastening element 98 that is implemented as a bolt, the fastening element 98 comprises a through-hole that extends transversely to a main extension. The safety spring 112 is herein guided, in the assembled state, through the through-hole in the fastening element 98. Herein the safety spring 112 is arranged in the puncture 110, as a result of which a detachment of the fastening element 98 out of the receiving element 106 can be prevented. For coupling with the fastening element 98, the structural component 22 comprises a receptacle 114, which is implemented as a blind hole. In the assembled state, a front end of the fastening element 98 is arranged in the receptacle 114 and thus couples in a form-lock the structural component 22 with the receiving element 106 and hence with the load-bearing frame 10. For mounting the structural component 22 that is embodied as an actuator unit, the structural component 22 that is embodied as an actuator unit is guided between the two receiving elements 88, 106, wherein, even with the fastening element 96 screwed in, there is sufficient room between the two receiving elements 88, 106 for a partial region of the structural component 22 embodied as an actuator unit, which partial region comprises the receptacles 114, 130. The fastening element 96 that is implemented as a thread pin is inserted into the receptacle 130 of the structural component 22 and is connected thereto in a form-lock. Then the fastening element 98 that is implemented as a bolt can be inserted into the receptacle 114 of the structural component 22 through the through-hole 108 of the receiving element 106, and can be secured by the safety spring 112. Herein the fastening element 98 that is implemented as a bolt forms in a front region a stop (not shown in detail), which in the assembled state abuts an exterior side of the structural component 22 and thus fixes the structural component 22 in an axial direction with respect to the fastening elements 96, 98.

The actuator 72 is provided for sliding the structural component 12 that is implemented as a central kinematics unit with respect to the load-bearing frame 10. Via the actuator 72 the structural component 12 implemented as a central kinematics unit can be slid with respect to the load-bearing frame 10 by way of the form-lock elements that are embodied as rails. The actuator 72 comprises an actuation rod 132. The actuation rod 132 is, for an adjustment of the structural component 12 that is implemented as a central kinematics unit, axially slidable in a main extension direction of the actuation rod 132. For the adjustment of the structural component 12 that is implemented as a central kinematics unit, a rear end of the actuation rod 132 is firmly coupled with the load-bearing frame 10. To this purpose the actuation rod 132 forms a receptacle at its rear end. The load-bearing frame 10 comprises a connection element that forms a correspondingly implemented receptacle. The connection element is firmly connected with the load-bearing frame 10. For the connection of the actuation rod 132 to the load-bearing frame 10, the aircraft seat device comprises the manually actuable fastening element 134. The manually actuable fastening element 134 is implemented as a spring pin. The actuation rod 132 is connected to the load-bearing frame 10 by way of the receptacle of the actuation rod 132 and the connection element of the load-bearing frame 10 as well as the fastening element 134. Herein a connection of the actuation rod 132 and the connection element of the load-bearing frame 10 can be manually established and released by means of the fastening element 134 that is embodied as a spring pin. By way of the structural component 22 that is embodied as an actuator unit and its connection to the load-bearing frame 10, the structural component 12 embodied as a central kinematics unit, of which the structural component 22 is a part, is nondetachably connected with the load-bearing frame 10.

The seventh structural component 24 is also embodied as an actuator unit. The structural component 24 embodied as an actuator unit is arranged between the fifth structural component 20 that is embodied as an actuator unit and the sixth structural component 22 that is embodied as an actuator unit. The seventh structural component 24 that is embodied as an actuator unit comprises an actuator 136. The actuator 136 is provided to adjust a kinematics of the structural component 12 that is embodied as a central kinematics unit. Thereby a position of the aircraft seat 26, of which the aircraft seat device is a part, can be adjusted by means of the actuator 136.

For the connection of an upper region of the structural component 24 to the structural component 12 that is embodied as a central kinematics unit, the aircraft seat device comprises a receiving element 104. The receiving element 104 is firmly connected with the profile element 46 of the frame 30 of the structural component 12. The receiving element 104 forms a U-shaped basis form. Herein the structural component 24 is in an assembled state arranged between two lateral regions 116, 118 of the receiving element 104 that is implemented in a U-shape. Herein a connection of the upper region of the structural component 24 is substantially equivalent to the connection of the bottom region of the structural component 22 to the receiving elements 88, 106. For the connection of the structural component 24 to the U-shaped receiving element 104, the aircraft seat device comprises a first manually actuable fastening element 100 and a second manually actuable fastening element 102. The fastening element 100 is implemented as a thread pin, which is firmly screwed into the lateral region 118 of the receiving element 104 and has a bolt-shaped partial region that engages in an assembled state into a receptacle in the structural component 22. The fastening element 102 is implemented as a bolt, which is arranged in a through-hole in the lateral region 116 of the receiving element 104, and which engages in an assembled state with a front end into a receptacle in the structural component 22 in a form-lock, and which is secured in the through-hole by a safety spring 120. The structural component 24 is mounted with its front end in a way equivalent to the mounting of the bottom region of the structural component 22.

Furthermore the aircraft seat device comprises a further fastening element 86, which is provided to connect the structural component 24 that is embodied as an actuator unit to a bottom region of the structural component 12 that is embodied as a central kinematics unit. The fastening element 86 is implemented as a ball lock pin. As an alternative to the implementation as a ball lock pin, it is conceivable that the fastening element 86 is embodied as a bolt with a spring compressor or some other spring element. The receiving element 88, which is firmly connected with the frame 30 of the structural component 12 that is embodied as a central kinematics unit, comprises a receptacle 90. The structural component 20 that is embodied as an actuator unit comprises a receptacle implemented as a through-hole 92, which is in an assembled state connected with the receptacle 90 of the receiving element 88 via the manually actuable fastening element 86 that is implemented as a ball lock pin. For mounting or demounting the structural component 20 that is embodied as an actuator unit, all fastening elements 86, 102 can be manually actuated by a person, to the purpose of coupling the structural component 20 that is embodied as an actuator unit to the frame 30 of the structural component 12 that is embodied as a central kinematics unit or of detaching it from the load-bearing frame 10.

The eighth structural component 138 is embodied as a legrest. The eighth structural component 138 embodied as a legrest is provided to be tool-lessly connected to the load-bearing frame 10. To this purpose, the aircraft seat device comprises a plurality of manually actuable fastening elements (not shown in detail). The fastening elements are herein, like the fastening elements 58 for fastening the structural component 16 that is embodied as a seat pan, embodied as fulcrum pins which are manually actuable. Principally it is of course also conceivable that the fastening elements for the connection of the structural component 138 embodied as a legrest are implemented as latch elements or other manually actuable fastening elements that are deemed expedient by the person skilled in the art.

REFERENCE NUMERALS

10 load-bearing frame
12 structural component
14 structural component
16 structural component
18 structural component
20 structural component
22 structural component
24 structural component
26 aircraft seat
28 mounting unit
30 frame
32 profile element
34 profile element
36 profile element
38 profile element
40 profile element
42 profile element
44 profile element
46 profile element
48 profile element
50 connection flange
52 connection flange
54 fastening element
56 fastening element
58 fastening element
60 receptacle
62 base body
64 head rest element
66 rail element
68 fastening element
70 actuator 72 actuator
74 rack device
76 profile element
78 recess
80 recess
82 fastening element
84 actuation ring
86 fastening element
88 receiving element
90 receptacle
92 through-hole
96 fastening element
98 fastening element
100 fastening element
102 fastening element
104 receiving element
106 receiving element
108 through-hole
110 puncture
112 safety spring
114 receptacle
116 lateral region
118 lateral region
120 safety spring
122 through-hole
124 actuation rod
126 fastening element
130 receptacle
132 actuation rod
134 fastening element
136 actuator
138 structural component

The invention claimed is:

1. An aircraft seat device comprising:
a load bearing frame comprising two form-lock elements, which are embodied as rails and are oriented in a seat direction parallel to each other; and
a plurality of structural components that are fastened at the load-bearing frame, wherein:
at least one of the plurality of structural components is tool-lessly mounted and demounted to and from the load-bearing frame using at least one manually actuable fastening element;
the at least one manually actuable fastening element arranges the at least one of the structural components at the load-bearing frame;
the at least one of the plurality of structural components is coupled to the load-bearing frame merely by the form-lock elements and by the fastening element;
the at least one of the plurality of structural components is implemented as a central kinematics (CK) unit, tool-lessly mounted and demounted to and from the load-bearing frame, the CK unit comprising a CK frame formed from a plurality of profile elements, the CK frame being pivotable and implementing a plurality of sitting and recumbent positions of an aircraft seat encompassing the aircraft seat device; and
at least a further one of the plurality of structural components is embodied as a seat pan, and is tool-lessly mounted to the CK frame.

2. The aircraft seat device according to claim 1, wherein another one of the plurality of structural components, implemented as an actuator unit comprising a rack device that holds an actuator, is further tool-lessly mounted and demounted to and from the CK frame.

3. The aircraft seat device according to claim 2, wherein the at least one manually actuable fastening element is actuated from above.

4. The aircraft seat device according to claim 1, wherein the at least one manually actuable fastening element is implemented as a spring pin.

5. The aircraft seat device according to claim 1, wherein at least one safety spring secures the at least one manually actuable fastening element for a connection in an assembled state.

6. The aircraft seat device according to claim 2, wherein the CK unit is completely pre-assembled with the actuator and is built into the load-bearing frame.

7. The aircraft seat that encompasses the aircraft seat device according to claim 1.

8. An aircraft seat device comprising:
a load bearing frame comprising two form-lock elements, which are embodied as rails and are oriented in a seat direction parallel to each other; and
a plurality of structural components that are fastened at the load-bearing frame, wherein:
at least one of the plurality of structural components, which is embodied as a central kinematics (CK) unit, which comprises a CK frame formed from a plurality of profile elements and which consists of a plurality of actuator units with actuators and mechanisms, which adjusts an aircraft seat encompassing the aircraft seat device,
and by means of which the aircraft seat can be traversed in various positions, and by means of which the aircraft seat can be pivoted, and by means of which a plurality of sitting and recumbent positions of the aircraft seat can be implemented,
is tool-lessly mounted and demounted to and from the load-bearing frame further comprising at least one manually actuable fastening element; and
the at least one of the plurality of structural components is coupled to the load-bearing frame merely by the form-lock elements and by the fastening element.

9. The aircraft seat device according to claim 1, wherein the at least one manually actuable fastening element is implemented as a bolt with a spring compressor.

10. The aircraft seat device according to claim 1, wherein the at least one manually actuable fastening element is implemented as a ball lock pin.

11. The aircraft seat device according to claim 2, wherein the actuator adjusts another of the plurality of structural components that is embodied as a footrest.

12. The aircraft seat device according to claim 1, wherein another one of the plurality of structural components, embodied as an actuator unit including an actuator, is further tool-lessly mounted and demounted to and from the CK frame, and
the actuator slides the CK unit, with respect to the load-bearing frame, by way of the rails.

13. The aircraft seat device according to claim 12, wherein
the fastening element of the actuator unit, which fastens the actuator unit to the CK unit, is embodied as a thread pin.

14. The aircraft seat device according to claim 1, wherein another one of the plurality of structural components, embodied as an actuator unit including an actuator, is further tool-lessly mounted and demounted to and from the CK frame, and
the actuator adjusts the kinematics of the CK unit.

15. The aircraft seat device according to claim 14, wherein
   the at least one manually actuable fastening element is implemented as a bolt with a spring compressor.

16. The aircraft seat device according to claim 14, wherein
   the at least one manually actuable fastening element is implemented as a ball lock pin.

17. The aircraft seat device according to claim 8, wherein
   another one of the plurality of structural components, implemented as an actuator unit comprising a rack device that holds an actuator, is further tool-lessly mounted and demounted to and from the CK frame.

18. The aircraft seat device according to claim 17, wherein
   the actuator adjusts another of the plurality of structural components that is embodied as a footrest.

19. The aircraft seat device according to claim 8, wherein
   another one of the plurality of structural components, embodied as an actuator unit including an actuator, is further tool-lessly mounted and demounted to and from the CK frame, and
   the actuator slides the CK unit, with respect to the load-bearing frame, by way of the rails.

20. The aircraft seat device according to claim 8, wherein
   another one of the plurality of structural components, embodied as an actuator unit including an actuator, is further tool-lessly mounted and demounted to and from the CK frame, and
   the actuator adjusts the kinematics of the CK unit.

\* \* \* \* \*